US009609211B2

United States Patent
Hwang et al.

(10) Patent No.: US 9,609,211 B2
(45) Date of Patent: Mar. 28, 2017

(54) METHOD OF IMAGE CONVERSION OPERATION FOR PANORAMA DYNAMIC IP CAMERA

(71) Applicant: National Taipei University of Technology, Taipei (TW)

(72) Inventors: Shaw Hwa Hwang, Taipei (TW); Bing Chih Yao, Taipei (TW); Kuan Lin Chen, Taipei (TW); Yao Hsing Chung, Taipei (TW); Chi Jung Huang, Taipei (TW); Li Te Shen, Taipei (TW); Shun Chieh Chang, Taipei (TW); Cheng Yu Yeh, Taipei (TW); Chao Ping Chu, Taipei (TW); Ning Yun Ku, Taipei (TW); Tzu Hung Lin, Taipei (TW); Ming Che Yeh, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 249 days.

(21) Appl. No.: 14/679,087

(22) Filed: Apr. 6, 2015

(65) Prior Publication Data

US 2016/0286123 A1 Sep. 29, 2016

(30) Foreign Application Priority Data

Mar. 27, 2015 (TW) .............................. 104109875 A

(51) Int. Cl.
*H04N 5/232* (2006.01)
*G06T 5/00* (2006.01)
*H04N 5/225* (2006.01)

(52) U.S. Cl.
CPC ....... *H04N 5/23238* (2013.01); *H04N 5/2258* (2013.01); *H04N 5/23206* (2013.01); *H04N 5/23216* (2013.01); *H04N 5/23293* (2013.01)

(58) Field of Classification Search
CPC ........... H04N 5/23238; H04N 5/23216; H04N 5/23293; H04N 5/2258; H04N 5/23206
See application file for complete search history.

(56) References Cited

U.S. PATENT DOCUMENTS

| 5,990,941 A * | 11/1999 | Jackson ........... G08B 13/19626 348/147 |
| 9,360,671 B1 * | 6/2016 | Zhou ..................... G02B 27/017 |
| 9,547,883 B1 * | 1/2017 | Stepanenko .......... G06T 3/0062 |
| 2007/0109398 A1 * | 5/2007 | Teo ..................... H04N 5/23238 348/36 |
| 2009/0138233 A1 * | 5/2009 | Kludas .................. G01C 15/00 702/158 |
| 2011/0202834 A1 * | 8/2011 | Mandryk ............ G06F 3/04883 715/701 |
| 2012/0249741 A1 * | 10/2012 | Maciocci ................ G06F 3/011 348/46 |
| 2012/0307001 A1 | 12/2012 | Osako et al. |

(Continued)

*Primary Examiner* — Neil Mikeska
(74) *Attorney, Agent, or Firm* — Bacon & Thomas, PLLC

(57) ABSTRACT

The present invention provides a method of image conversion operation for panorama dynamic IP camera. Three wide-angle cameras are used for obtaining a panorama dynamic image, and then to be compressed and transferred through Internet to a PC/smartphone/tablet for being decompressed and image conversion operation, so that a user can use the PC/smart phone/tablet to slide a touch screen thereof for viewing the desired dynamic image.

3 Claims, 5 Drawing Sheets

(56) References Cited

U.S. PATENT DOCUMENTS

2016/0050360 A1* 2/2016 Fisher ................ G03B 17/561
348/207.11
2016/0078593 A1* 3/2016 Mesguich Havilio .... G06T 3/40
345/668

* cited by examiner

METHOD OF IMAGE CONVERSION OPERATION FOR PANORAMA DYNAMIC IP CAMERA

FIELD OF THE INVENTION

The present invention relates to a method of image conversion operation for panorama dynamic IP (Internet Protocol) camera, and more particularly to a method of image conversion operation for IP camera to obtain panorama dynamic image by using three wide-angle cameras.

BACKGROUND OF THE INVENTION

Referring to FIG. 1, by using a PC (Personal Computer)/smartphone/tablet 1 to connect with a rotatable camera 3 via Internet 2, a user 4 can slide a touchscreen of the PC/smartphone/tablet 1 to control the rotatable camera 3 to rotate 120° up and down and rotate 360° left and right for viewing the scenery on-site. This is a prior art. The rotatable camera 3 has only one lens, and cannot rotate 360° up and down, so a real panoramagram is unable to get.

Referring to FIG. 2, which shows schematically a pluralitry of cameras are used for a Google Street View. Twelve cameras are arranged in a circle, and there is another camera directed upward. The images captured by the thirteen cameras are combined to form a street map at the fixed point of the Google Street View. As the Google Street View moves forward, the street maps captured by the thirteen cameras continuously are connected in series to form a street maps continually. The street maps are stored in a map-site of Google, a user uses the PC/smartphone/tablet 1 to log into the map-site of Google for viewing the desired street map, having the feeling of being personally on the scene. But the street map is not a dynamic scene on-site, it was a static scene at the time that the Google Street View captured the street map.

SUMMARY OF THE INVENTION

The object of the present invention is to provide a method of image conversion operation for panorama dynamic IP (Internet Protocol) camera. Three wide-angle cameras are used for obtaining a panorama dynamic image, and then to be compressed and transferred through Internet to a PC/smart phone/tablet for being decompressed and image conversion operation, so that a user can use the PC/smart phone/tablet to slide a touch screen thereof for viewing the desired dynamic image.

In the method of image conversion operation, a dynamic image captured by three wide-angle cameras panoramically is divided equally into an upper block, a middle block and a bottom block, when a browser frame of a PC (Personal Computer)/smartphone/tablet is moved by a user by sliding a touchscreen of the PC/smartphone/tablet for reading a desired dynamic image, the method comprises steps as below:

a. if the browser frame is moved along the middle block, the dynamic image covered by the browser frame is displayed on the touchscreen of the PC/smartphone/tablet directly;

b. if the browser frame is moved along the upper block or the bottom block, a horizontal length of the upper block or the bottom block is w, for any point (x, y) in the browser frame, a radius r and an angle θ are calculated from the coordinates x and y as below:

$r=\sqrt{(x^2+y^2)}$ $\theta=\arctan(y/x)$ a pixel corresponding to the point (r, θ) has a distance r away from an upper edge of the upper block or an bottom edge of the bottom block, and has a distance w*(θ/360) away from a left edge of the upper block or the bottom block; the pixel is filled to the point (x, y) in the browser frame; in the same way, each point in the browser frame can be filled by a pixel in the upper block or the bottom block so that a real top dynamic image or a bottom dynamic image captured by the three wide-angle cameras is displayed in the browser frame without distortion.

DETAILED DESCRIPTIONS OF THE PREFERRED EMBODIMENTS

Figure 1:
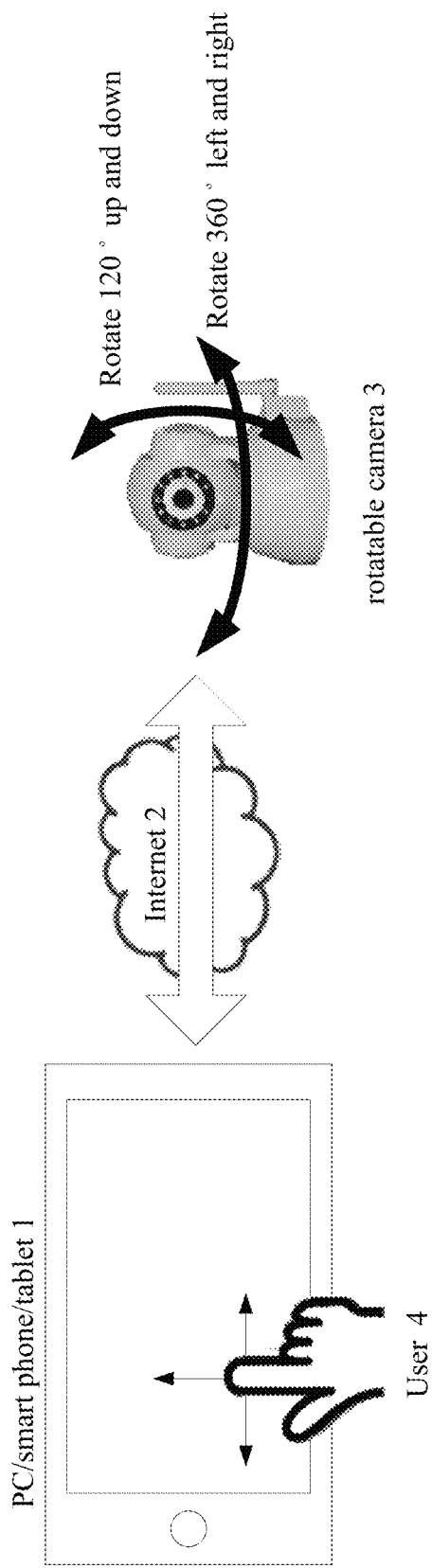
FIG. 1 shows schematically a rotatable camera can be controlled via Internet to rotate for taking pictures in the prior art.
Figure 2:
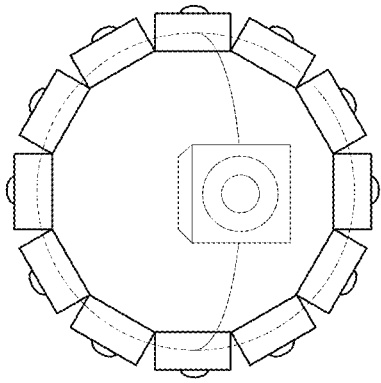
FIG. 2 shows schematically a pluralitry of cameras are on a Google Street View.
Figure 3:
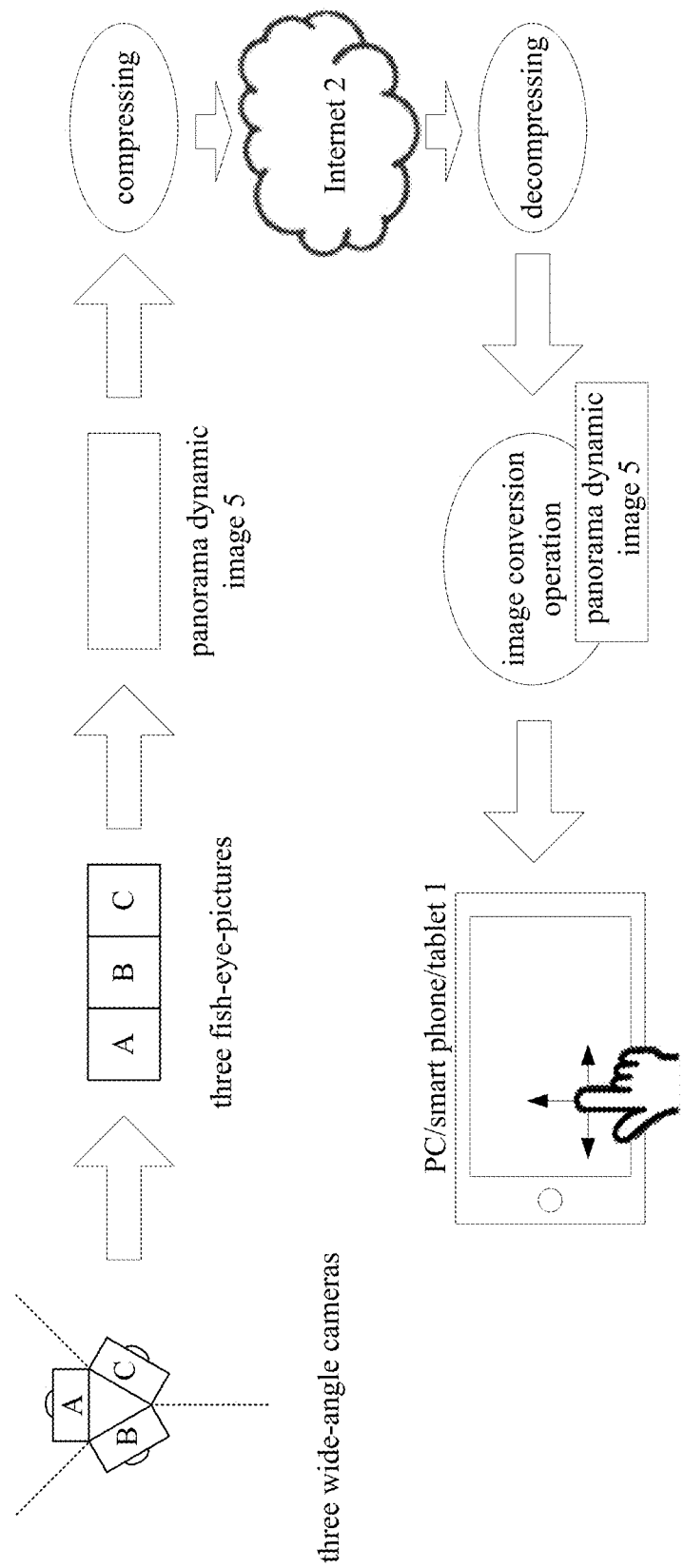
FIG. 3 shows schematically a system of panorama dynamic IP camera according to the present invention.

Referring to FIG. 3, a system of panorama dynamic IP (Internet Protocol) camera according to the present invention is described clockwise. Three wide-angle cameras are assembled together for capturing a panorama dynamic image on-site. Three fish-eye-pictures A, B, C are therefore obtained for combining into a panorama dynamic image 5 on-site, and then to be compressed and transferred through Internet 2 to a PC/smartphone/tablet 1 of the user 4 for being decompressed and image conversion operation, so that the user 4 can use the PC/smartphone/tablet 1 to slide the touch screen thereof for viewing the desired dynamic image.

The steps in FIG. 3 are prior arts except the "image conversion operation". The "image conversion operation" is the key point of the present invention. After the image decompression in FIG. 3, the "image conversion operation" is performed as described in FIG. 4 and FIG. 5.

Figure 4:
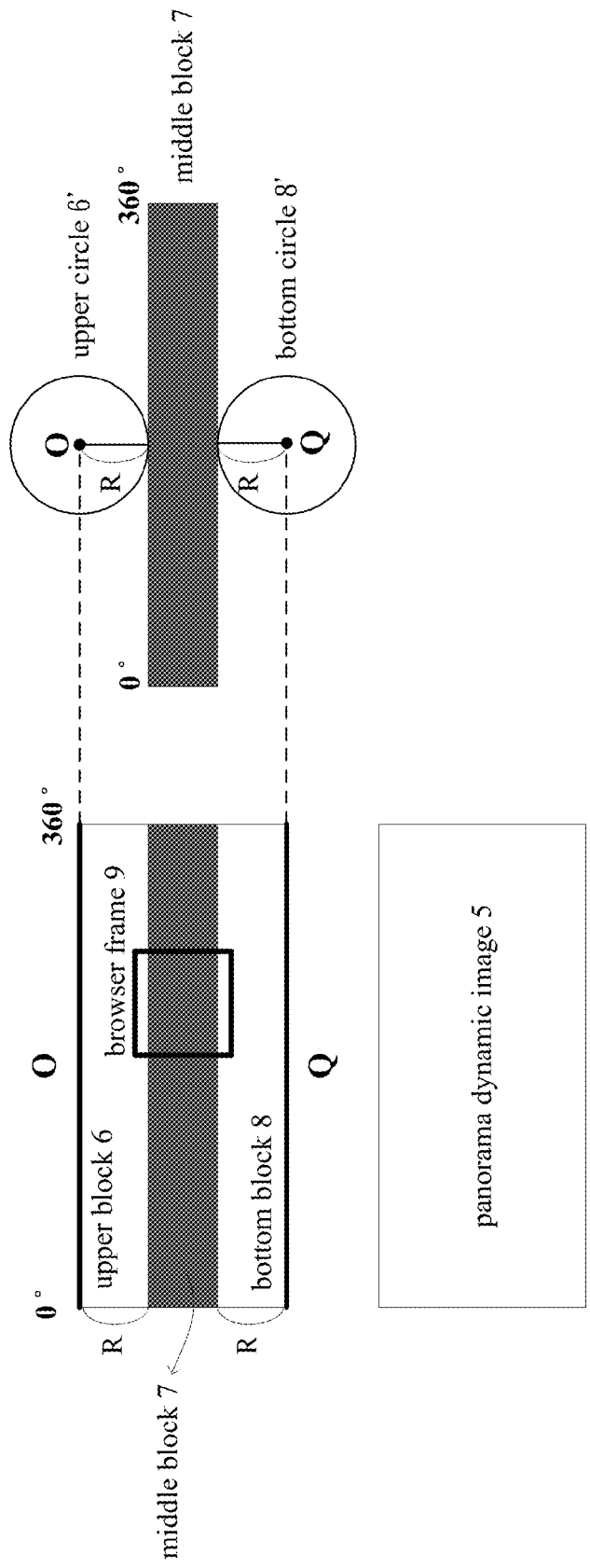
FIG. 4 shows schematically the panorama dynamic image is divided equally into an upper block, a middle block and a bottom block according to the present invention.

Referring to FIG. 4, after the PC/smartphone/tablet 1 of the user 4 receives the decompressed panorama dynamic image 5, the decompressed panorama dynamic image 5 is divided equally into an upper block 6, a middle block 7 and a bottom block 8. A browser frame 9 of the PC/smartphone/tablet 1 is moved by the user 4 for sliding a touchscreen of the PC/smartphone/tablet 1 so as to read the panorama dynamic image 5 of the desired angle.

If the browser frame 9 is moved along the middle block 7, it means that the user 4 adopts a horizontal view angle to view the horizontal dynamic image captured by the three wide-angle cameras. The horizontal dynamic image is not distorted, so there is no need to perform any operation, the dynamic image covered by the browser frame 9 is displayed on the browser frame 9 of the PC/smartphone/tablet 1 directly.

If the browser frame 9 is moved along the upper block 6, it means that the user 4 adopts a bottom view angle to view the top dynamic image captured by the three wide-angle cameras. The top dynamic image is distorted, so an operation is needed for displaying the original real image.

Similarly, if the browser frame 9 is moved along the bottom block 8, it means that the user 4 adopts a top view angle to view the bottom dynamic image captured by the three wide-angle cameras. The bottom dynamic image is distorted, so an operation is needed for displaying the original real image.

The upper block 6 is rectangular in FIG. 4, but actually the line O is the centre O of a circle formed by the three wide-angle cameras. The rectangular area of the upper block 6 is formed by an upper circle 6'; the width R of the upper block 6 is actually the radius R formed by the three wide-angle cameras, as shown at right of FIG. 4.

The bottom block 8 is rectangular in FIG. 4, but actually the line Q is the centre Q of a circle formed by the three wide-angle cameras. The rectangular area of the bottom block 8 is formed by a bottom circle 8'; the width R of the bottom block 6 is actually the radius R formed by the three wide-angle cameras, as shown at right of FIG. 4.

If the browser frame 9 is moved along the upper block 6 or the bottom block 8, the dynamic image covered by the browser frame 9 cannot be displayed directly on the touchscreen, an operation is needed to find the corresponding pixels to recover the real image so that the picture displayed on the browser frame 9 of the PC/smartphone/tablet 1 is not distorted.

Figure 5:
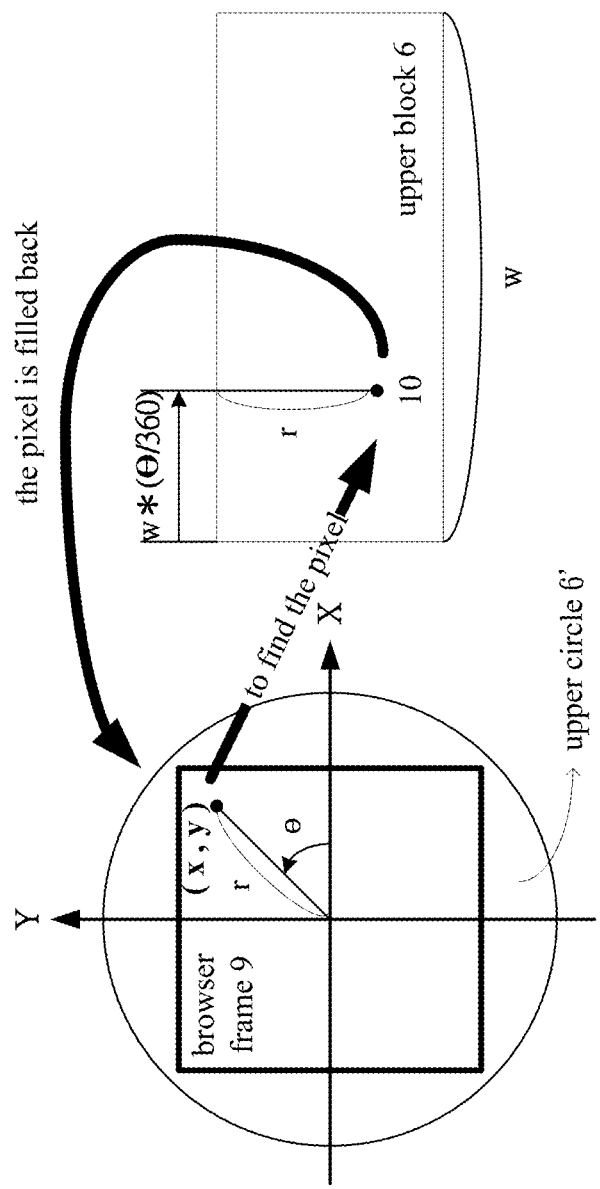
FIG. 5 shows schematically the method of image conversion operation according to the present invention when the browser frame is moved along the upper block or the bottom block.

Referring to FIG. 5, the method of image conversion operation according to the present invention when the browser frame 9 is moved along the upper block 6 or the bottom block 8 is described, take the upper block 6 as an example to describe, and the horizontal length of the upper block 6 is w.

For any point (x, y) in the browser frame 9, a radius r and an angle θ are calculated from the coordinates x and y as below:

$$r\sqrt{(x^2+y^2)} \quad (1)$$

$$\theta = \arctan(y/x) \quad (2)$$

The pixel corresponding to the point (r, θ) is shown at a black point 10 in the upper block 6 at right of FIG. 5, the distance between the black point 10 and the upper edge of the upper block 6 is r, the distance between the black point 10 and the left edge of the upper block 6 is w*(θ/360). The pixel at the black point 10 is filled to the point (x, y) in the browser frame 9. In the same way, each point in the browser frame 9 can be filled by a pixel in the upper block 6 so that the real top dynamic image captured by the three wide-angle cameras is displayed in the browser frame 9 without distortion.

The method of image conversion operation for the bottom block 8 is the same as that of the upper block 6, but r is the distance between the black point 10 and the bottom edge of the bottom block 8, the black point 10 is in the bottom block 8.

If the browser frame 9 is moved between the upper block 6 and the middle block 7, the area ratio between the upper block 6 and the middle block 7 is a factor. If the area ratio for the upper block 6 to the middle block 7 is ≤1, no operation is needed, the dynamic image covered by the browser frame 9 is displayed on the touchscreen of the PC/smartphone/tablet 1 directly. If the area ratio for the upper block 6 to the middle block 7 is >1, then the method of image conversion operation according to the present invention when the browser frame 9 is moved along the upper block 6 is employed to find the corresponding pixels for filling.

Similarly, if the browser frame 9 is moved between the bottom block 8 and the middle block 7, the area ratio between the bottom block 8 and the middle block 7 is a factor. If the area ratio for the bottom block 8 to the middle block 7 is ≤1, no operation is needed, the dynamic image covered by the browser frame 9 is displayed on the touchscreen of the PC/smartphone/tablet 1 directly. If the area ratio for the bottom block 8 to the middle block 7 is >1, then the method of image conversion operation according to the present invention when the browser frame 9 is moved along the bottom block 8 is employed to find the corresponding pixels for filling.

The key points of the present invention are: only three wide-angle cameras are used to obtain the panorama dynamic image 5; and the panorama dynamic image 5 is only divided equally into an upper block 6, a middle block 7 and a bottom block 8; and then the formulas (1) and (2) are employed to perform an operation on the upper block 6 and the bottom block 8, so a relatively small amount of calculation is achieved; and a real 360° panoramagram is able to get for viewing the dynamic image on-site, not just a static image at the past time.

The scope of the present invention depends upon the following claims, and is not limited by the above embodiments.

What is claimed is:

1. A method of image conversion operation for panorama dynamic IP (Internet Protocol) camera, a dynamic image captured by three wide-angle cameras panoramically and received by a PC(Personal Computer)/smartphone/tablet via Internet is divided equally into an upper block, a middle block and a bottom block, when a browser frame of the PC/smartphone/tablet is moved by a user by sliding a touchscreen of the PC/smartphone/tablet for reading a desired dynamic image, the method comprises steps as below:

(a) if the browser frame is moved along the middle block, the dynamic image covered by the browser frame is displayed on the touchscreen of the PC/smartphone/tablet directly;

(b) if the browser frame is moved along the upper block or the bottom block, a horizontal length of the upper block or the bottom block is w, for any point (x, y) in the browser frame, a radius r and an angle θ are calculated from the coordinates x and y as below:

$$r\sqrt{(x^2+y^2)}$$

$$\theta = \arctan(y/x)$$

a pixel corresponding to the point (r, θ) has a distance r away from an upper edge of the upper block or an bottom edge of the bottom block, and has a distance w*(θ/360) away from a left edge of the upper block or the bottom block; the pixel is filled to the point (x, y) in the browser frame; in the same way, each point in the browser frame can be filled by a pixel in the upper block or the bottom block so that a real top dynamic image or a bottom dynamic image captured by the three wide-angle cameras is displayed in the browser frame without distortion.

2. The method of image conversion operation for panorama dynamic IP camera according to claim 1, wherein if the browser frame is moved between the upper block and the middle block, an area ratio between the upper block and the middle block is a factor; if the area ratio for the upper block to the middle block is ≤1, no operation is needed, the dynamic image covered by the browser frame is displayed on the touchscreen of the PC/smartphone/tablet directly; if the area ratio for the upper block to the middle block is >1, then the method of image conversion operation according to claim 1 when the browser frame is moved along the upper block is employed to find the corresponding pixels for filling.

3. The method of image conversion operation for panorama dynamic IP camera according to claim 1, wherein if the browser frame is moved between the bottom block and the middle block, an area ratio between the bottom block and the middle block is a factor; if the area ratio for the bottom block to the middle block is ≤1, no operation is needed, the dynamic image covered by the browser frame is displayed on the touchscreen of the PC/smartphone/tablet directly; if the area ratio for the bottom block to the middle block is >1, then the method of image conversion operation according to claim 1 when the browser frame is moved along the bottom block is employed to find the corresponding pixels for filling.

* * * * *